United States Patent
Davidson, Sr. et al.

(10) Patent No.: US 7,240,688 B2
(45) Date of Patent: Jul. 10, 2007

(54) RETROFITTING A FIRE HYDRANT WITH SECONDARY VALVE

(75) Inventors: Thomas Dewey Davidson, Sr., Griffin, GA (US); Anthony Ferrari, McDonough, GA (US); David Michael Walden, Sharpsburg, GA (US); Matthew Jesse Rose, Macon, GA (US)

(73) Assignee: Davidson Hydrant Technologies, Inc., Sunny Side, GA (US)

( * ) Notice: Subject to any disclaimer, the term of this patent is extended or adjusted under 35 U.S.C. 154(b) by 0 days.

(21) Appl. No.: 11/367,289

(22) Filed: Mar. 2, 2006

(65) Prior Publication Data

US 2006/0207657 A1    Sep. 21, 2006

Related U.S. Application Data

(63) Continuation-in-part of application No. 10/997,733, filed on Nov. 23, 2004, now Pat. No. 7,055,544, which is a continuation-in-part of application No. 10/309,646, filed on Dec. 4, 2002, now Pat. No. 6,868,860.

(51) Int. Cl.
  *E03B 9/02*    (2006.01)
  *F16K 15/18*   (2006.01)
(52) U.S. Cl. .................... 137/15.02; 137/299
(58) Field of Classification Search ........... 137/299, 137/272, 15.02, 218, 614.2
  See application file for complete search history.

(56) References Cited

U.S. PATENT DOCUMENTS

| | | | |
|---|---|---|---|
| 154,087 A | 8/1874 | Roberts | |
| 726,369 A | 4/1903 | Sullivan | |
| 1,562,223 A | 11/1925 | Gannestad | |
| 1,601,993 A | 10/1926 | Blake | |
| 2,083,319 A | 6/1937 | Daviet | |
| 2,109,187 A * | 2/1938 | Vogel | ............ 137/299 |
| 2,244,993 A | 6/1941 | Hollifield | |
| 2,515,770 A | 7/1950 | Grönberg | |
| 2,580,199 A | 12/1951 | Schmid | |
| 3,017,896 A | 1/1962 | Papacek | |
| 3,035,609 A | 5/1962 | Dyer | |
| 3,294,109 A | 12/1966 | Smith | |
| 3,475,978 A | 11/1969 | Dunton | |
| 3,566,905 A | 3/1971 | Noland | |

(Continued)

FOREIGN PATENT DOCUMENTS

CH    675139 A    8/1990

(Continued)

OTHER PUBLICATIONS

International Search Report, May 4, 2004, issued by European Patent Office for PCT US03/37681.

*Primary Examiner*—Kevin Lee
(74) *Attorney, Agent, or Firm*—Kilpatrick Stockton LLP

(57) ABSTRACT

The present invention relates to methods and devices for retrofitting fire hydrants with additional structure for reducing the potential that those with ill intent can foul municipal water supplies by introducing toxins or other materials into fire hydrants. Various embodiments include a seat and elongated member for efficient and cost effective installation and cooperation with valves, which close off portions of the hydrant otherwise available for receipt of toxic or other materials when the fire hydrant nozzle cap is unscrewed and open.

21 Claims, 9 Drawing Sheets

U.S. PATENT DOCUMENTS

| | | |
|---|---|---|
| 3,586,019 A | 6/1971 | Thomas et al. |
| 3,939,861 A | 2/1976 | Thompson |
| 3,952,770 A | 4/1976 | Botnick |
| 3,980,097 A | 9/1976 | Ellis |
| 4,139,931 A | 2/1979 | Royce |
| 4,393,891 A | 7/1983 | Snoek et al. |
| 4,440,190 A * | 4/1984 | Barbe ............... 137/15.02 |
| 4,475,570 A | 10/1984 | Pike et al. |
| 4,602,654 A | 7/1986 | Stehling et al. |
| 4,791,952 A | 12/1988 | Laurel |
| 4,909,270 A | 3/1990 | Enterante et al. |
| 5,029,603 A | 7/1991 | Ackroyd |
| 5,129,416 A | 7/1992 | Ackroyd |
| 5,549,133 A | 8/1996 | Sigelakis |
| 5,609,179 A | 3/1997 | Knapp |
| 5,622,202 A | 4/1997 | Etter et al. |
| 6,401,745 B1 | 6/2002 | Corder |
| 6,488,048 B2 | 12/2002 | Kuhmayer et al. |
| 6,910,495 B2 | 6/2005 | Lafalce |
| 7,128,083 B2 * | 10/2006 | Fleury et al. ............... 137/272 |

FOREIGN PATENT DOCUMENTS

| | | |
|---|---|---|
| DE | 229997 C | 1/1911 |
| DE | 236 645 | 11/1911 |
| DE | 639655 C | 12/1936 |
| EP | 0 113 913 A1 | 7/1984 |
| EP | 0 463 702 A1 | 1/1992 |
| EP | 1 010 821 A1 | 6/2000 |
| FR | 2773373 | 7/1999 |

* cited by examiner

RETROFITTING A FIRE HYDRANT WITH SECONDARY VALVE

CROSS REFERENCE TO RELATED APPLICATIONS

This application is a continuation-in-part of U.S. patent application Ser. No. 10/997,733 now U.S. Pat. No. 7,055,544, entitled "Fire Hydrant With Second Valve" and filed Nov. 23, 2004, which is a continuation-in-part of U.S. patent application Ser. No. 10/309,646, entitled "Fire Hydrant With Second Valve" and filed Dec. 4, 2002 now U.S. Pat. No. 6,868,860, the entire contents of each of which are hereby incorporated by this reference.

RELATED FIELDS

Various aspects and embodiments of the present invention relate to retrofitting fire hydrants with additional valving in order to render more difficult the task of introducing toxins into a water supply.

BACKGROUND

Conventional fire hydrants offer access to a municipal water supply in a manner in which operatives with ill intent may appreciate. Briefly, conventional fire hydrants include at least one nozzle for coupling to a fire hose. A threaded cap closes off the nozzle when the hydrant is not in use. The hydrant also includes a hydrant valve which controls flow of water from the water supply to and through the hydrant, through the nozzle, and into the fire hose.

Conventionally, the barrel of the hydrant between the nozzle and the hydrant valve, which is in the lower portion of the hydrant, accommodates several gallons of fluid. Accordingly, it is possible to unscrew a nozzle cap, introduce gallons of toxin, reattach the nozzle cap and open the hydrant valve to allow the toxins to communicate with and flow by gravity and perhaps at least to some extent by Bernoulli's principle, into the municipal water supply, since when the nozzle cap is attached, water pressure from the water supply would not force the toxins back out of the hydrant.

Accordingly, in U.S. patent application Ser. No. 11/265,051, entitled "Fire Hydrant With Second Valve," which is a continuation-in-part of U.S. patent application Ser. No. 10/309,646, entitled "Fire Hydrant With Second Valve," the entire contents of each of which are hereby incorporated by this reference, a seat is affixed to the interior cavity of the fire hydrant using an adhesive or mechanical means, a valve structure is introduced between the nozzle and the hydrant valve and cooperates with the seat to make it more difficult or impossible to introduce toxins to a water supply through a fire hydrant. The valve structure prevents or substantially prevents the flow of water through the valve and thus closes off portions of the hydrant barrel when a nozzle is open but the hydrant valve is closed. Generally, the valve structure comprises a secondary valve, a seat, and biasing structure.

Retrofitting fire hydrants with a secondary valves may be accomplished by removing the hydrant barrel, inserting the secondary valve and affixing the seat to the hydrant body with an adhesive or mechanical means, such as a screw. While this is an effective method for installing the secondary valve, another less expensive and more efficient method is needed to retrofit a fire hydrant with the secondary valve.

SUMMARY

One or more of various structures and embodiments according to the present invention may be utilized to retrofit a fire hydrant with an additional valve in order to make the retrofitting process more efficient and less costly. Structures such as an insert according to various embodiments of the present invention may allow quick installation of an additional valve in a fire hydrant to close off portions of the hydrant barrel when a nozzle is open but the hydrant valve is closed and thus save time and money. An insert or other structure according to various embodiments of the present invention, are preferably introduced between the lowest nozzle in the hydrant and the main hydrant valve during the installation of an additional valve.

According to various aspects and embodiments of the present invention, the insert may include a valve seat, an elongated member and a flange portion. During installation of a secondary valve, an upper portion of a fire hydrant may be removed, the secondary valve installed, and the seat positioned along with an elongated member and flange portion.

It is accordingly an object of various embodiments of the present invention to provide structures for retrofitting into fire hydrants in order to reduce the possibility of toxins being introduced into a water supply.

It is an additional object of various embodiments of the present invention to provide quick installation of additional structure for fire hydrants in order to reduce the possibility of toxins being introduced into a water supply.

It is an additional object of various embodiments of the present invention to provide a valve seat adapted to be easily installed in a fire hydrant barrel and capable of cooperating with a valve to restrict the flow of water in the hydrant barrel upon certain conditions.

Other objects, features, and advantages of various embodiments of the present invention will become apparent with respect to the remainder of this document.

BRIEF DESCRIPTION

DETAILED DESCRIPTION

Figure 1:
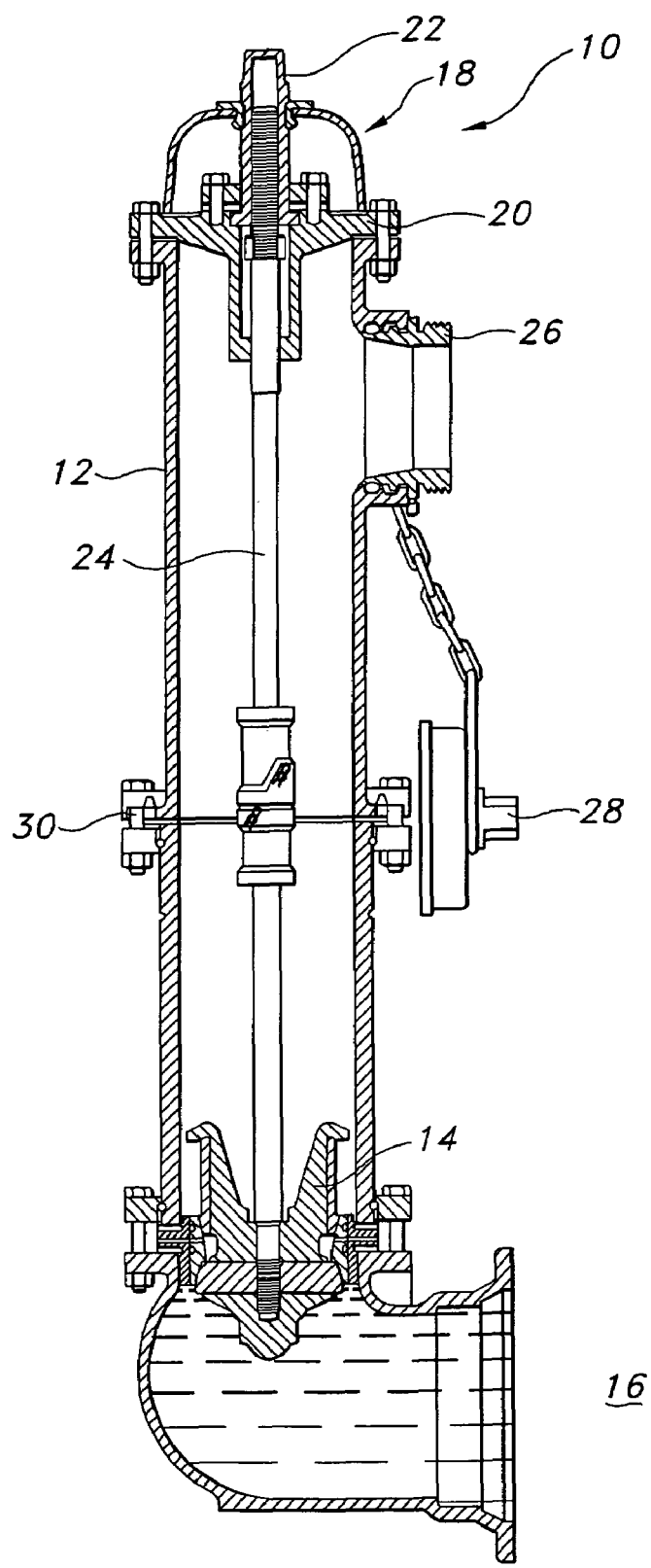
FIG. 1 shows a cross section of a conventional fire hydrant with nozzle cap removed and hydrant valve closed.

FIG. 1 shows a conventional fire hydrant 10. Hydrant 10 typically includes a substantially vertical barrel 12 through which water may flow from a water main to a fire hose given certain circumstances as discussed generally below. At one end of the barrel 12 is a hydrant valve 14, which controllably interrupts fluid flow between a water supply 16 and the barrel 12. At the upper end of the barrel 12 may be found a cap structure 18 which can include, for instance, a housing cover 20 and an operating nut 22 which rotates within the housing cover. The operating nut 22 includes threads, which receive threads on an actuator rod 24, which in turn connects to the hydrant valve 14. Not only does the cap structure 18 seal the top portion of the barrel 12 to prevent the flow of water, but operating nut 22 may be used by fire fighters or others to open the hydrant valve 14 via actuator rod 24. Hydrant 10 includes at least one nozzle 26 and can include more nozzles 26. Each nozzle 26 may be closed with a cap 28 such as a threaded cap. The hydrant may also include breakaway structure such as a traffic feature 30.

In normal operation, the hydrant 10 may be employed as follows to help fight fires, provide refreshing summer breaks for overheated urban citizens and/or their offspring, participants in road races, or for other purposes or beneficiaries. First, a hose (not shown) may be connected to nozzle 26, usually in a threaded fashion after the cap 28 has been removed (See, e.g., FIG. 1). Then, after the hose is connected, operating nut 22 may be rotated with a wrench to cause actuator rod 24 to push down on relevant portions of hydrant valve 14 in order to open hydrant valve 14 (See, e.g., FIG. 4). When valve 14 opens, water flows from the water supply 16 through hydrant valve 14 through barrel 12, out nozzle 26 into the hose and accordingly toward its desired application or destination.

Figure 2:
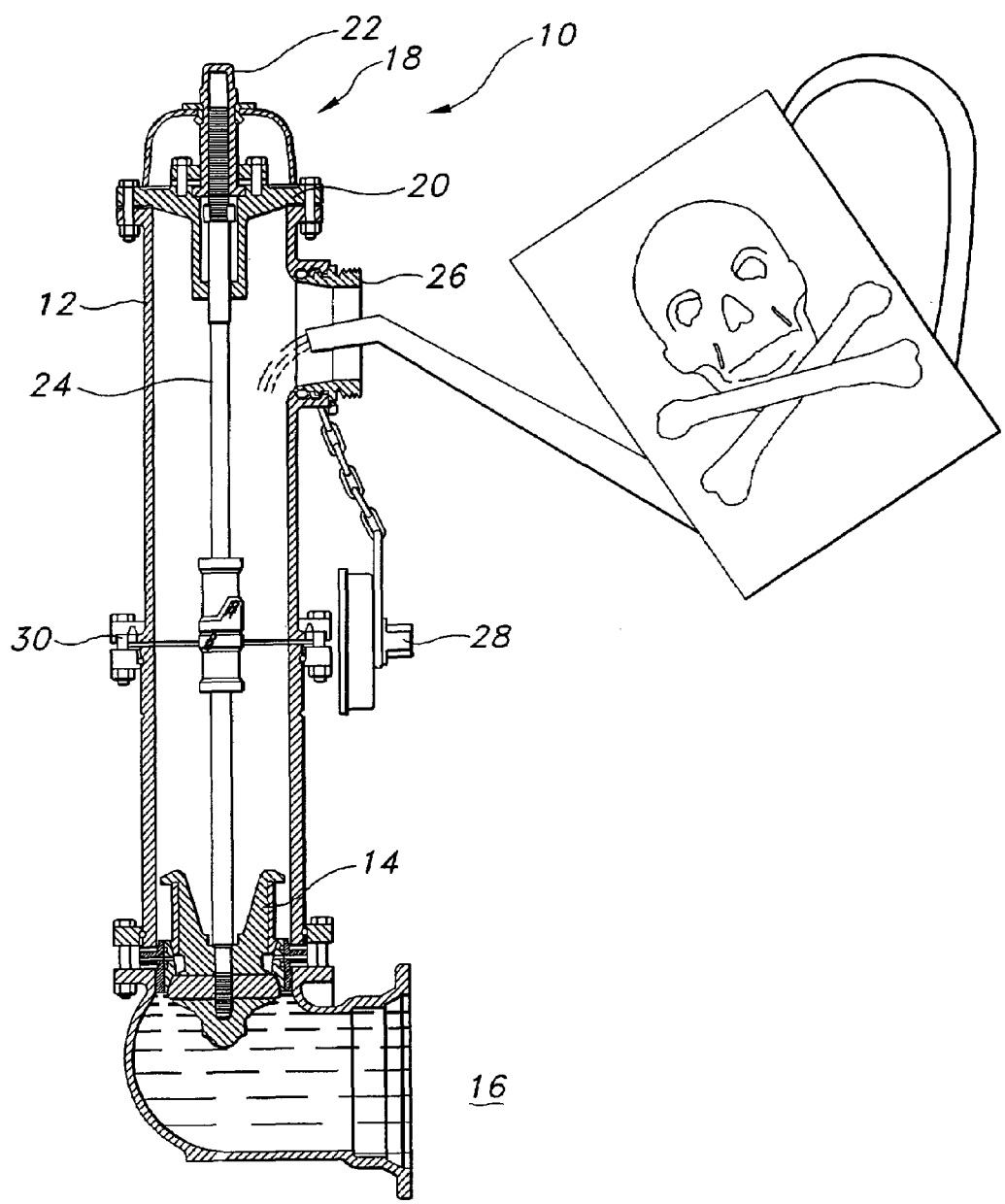
FIG. 2 shows toxins being introduced into the nozzle of the hydrant of FIG. 1.
Figure 3:
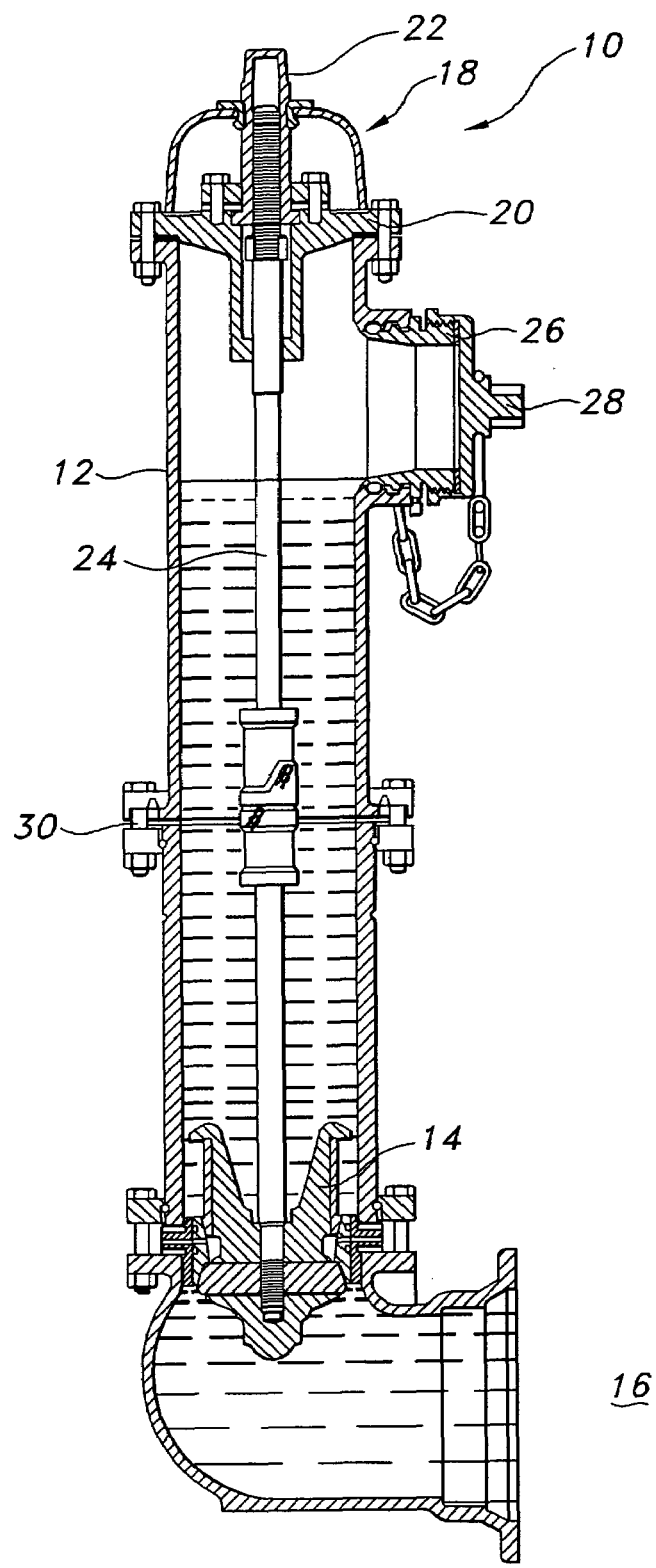
FIG. 3 shows the cap replaced on the nozzle of the hydrant of FIG. 1 after toxins have been introduced.
Figure 4:
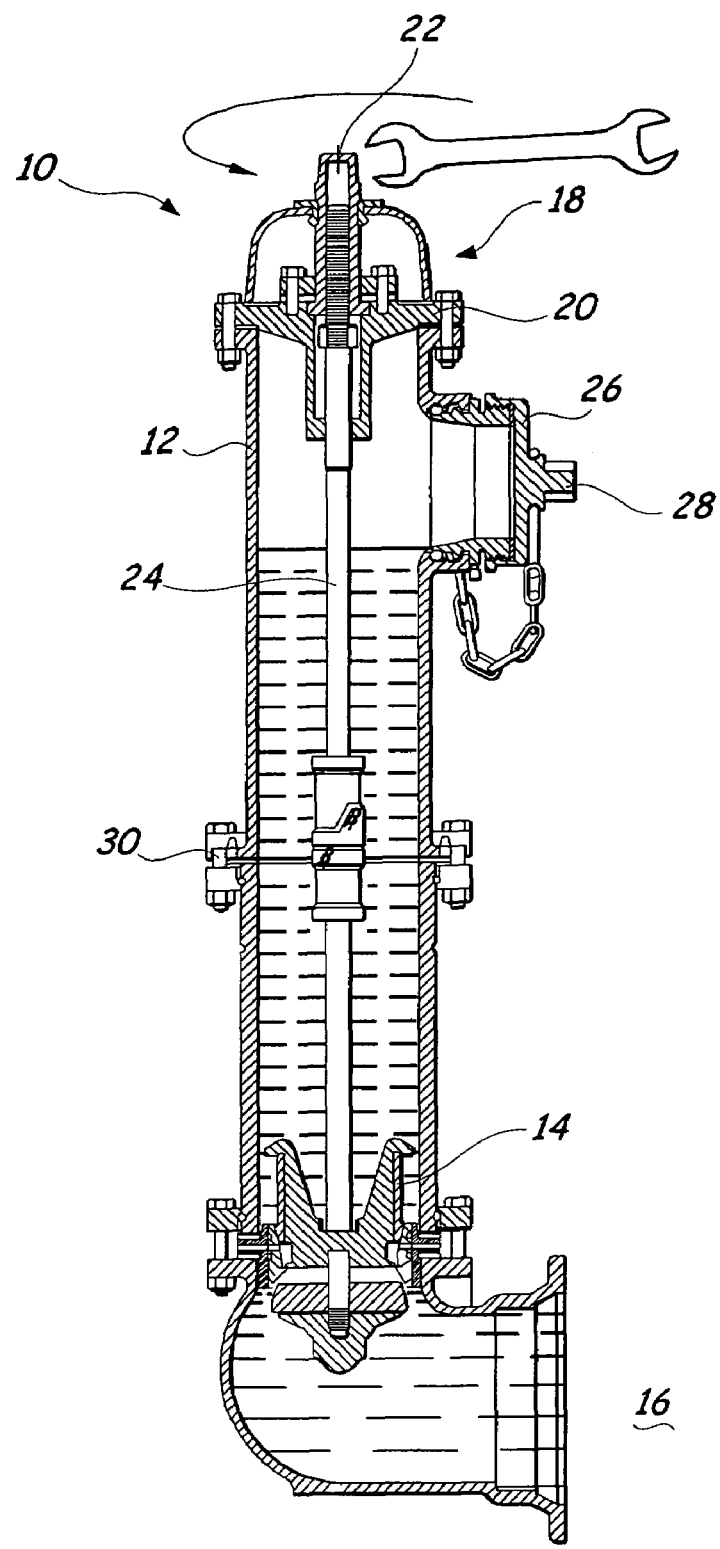
FIG. 4 shows opening of the hydrant valve of the hydrant of FIG. 1 after toxins have been introduced and the nozzle closed.
Figure 5:
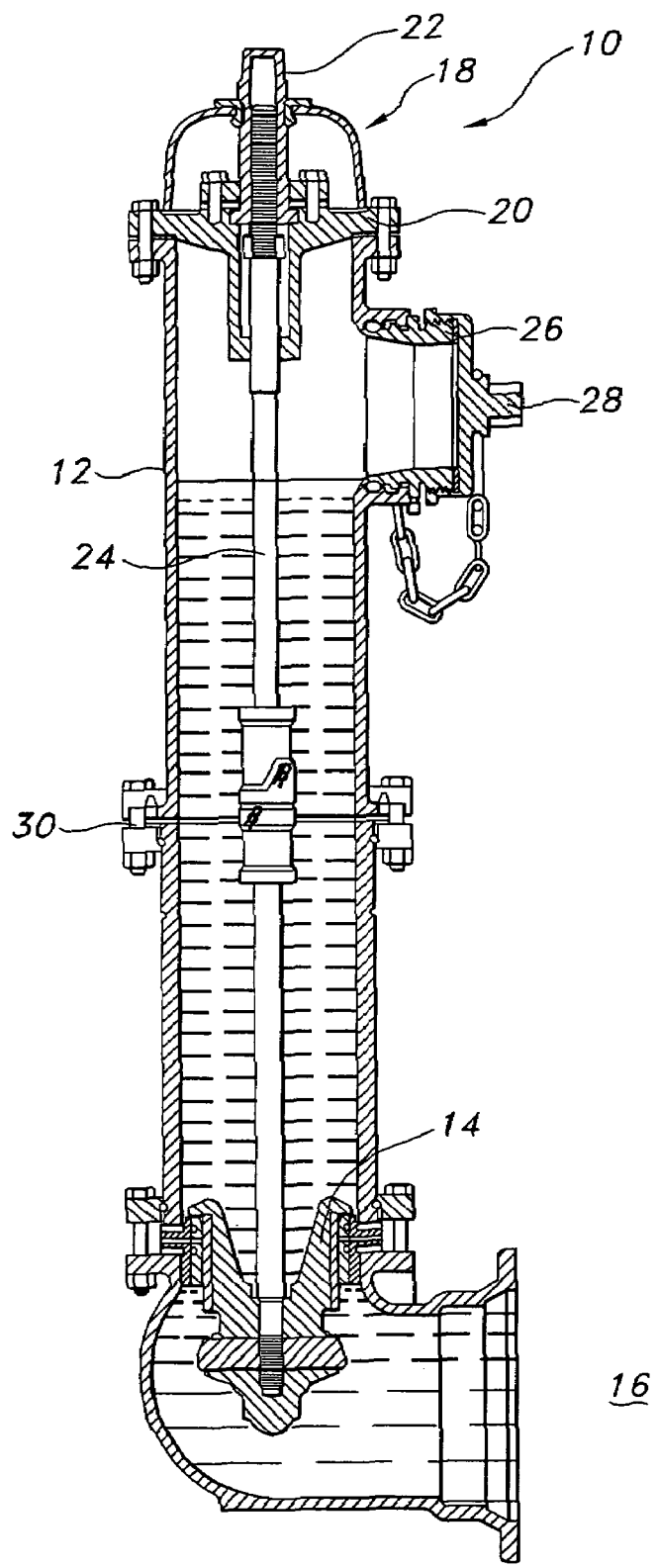
FIG. 5 shows toxins being introduced into a water supply as a result of the sequence shown in FIGS. 1–4.

However, hydrant 10 may also be the subject of attention from miscreants who have the temerity to attempt to introduce toxins into a public water supply. Such concerns have heightened since the date known as "9-11" (Sep. 11, 2001) when terrorists activities became the focus of heightened concern. Accordingly, the need for structures according to various embodiments of the present invention became more apparent after that bellweather event, even if they were foreseen by the inventor named in this document beforehand. More particularly, a person with ill design can attempt to introduce toxins into a water supply 16 taking advantage of the fact that the barrel 12 of a hydrant 10 between the nozzle 26 and the hydrant valve 14 can accommodate several gallons of liquid or solid material. Accordingly, as shown in FIGS. 1–5, a malefactor can unscrew cap 28 as shown in FIG. 1, introduce toxins as shown in FIG. 2, screw the cap back on as shown in FIG. 3, and open the hydrant valve 14 as shown in FIG. 4. When the nozzle 26 or all nozzles 26 are closed off and the valve 14 opened, the liquid or solid toxins in the barrel 12 can communicate with liquid in the water supply 16 in order to foul the water supply 16, as shown in FIG. 5, to the potential detriment of all those whose facilities are in communication with such water supply 16.

Various structures according to various embodiments of the present invention prevent or reduce the possibility of such unworthy and direct reprobatory activity. Generally, various structures according to various embodiments of the present invention introduce physical structure between nozzle 26 and hydrant valve 14 through which water flows only when a nozzle 26 and hydrant valve 14 are open. Alternatively, or in combination, such structure may close off portions of the barrel 12 below the nozzle 26 in order to deprive miscreants of at least a portion, if not all, of the space available into which to load toxins before closing the nozzle 26 and opening the valve 14.

Figure 6:
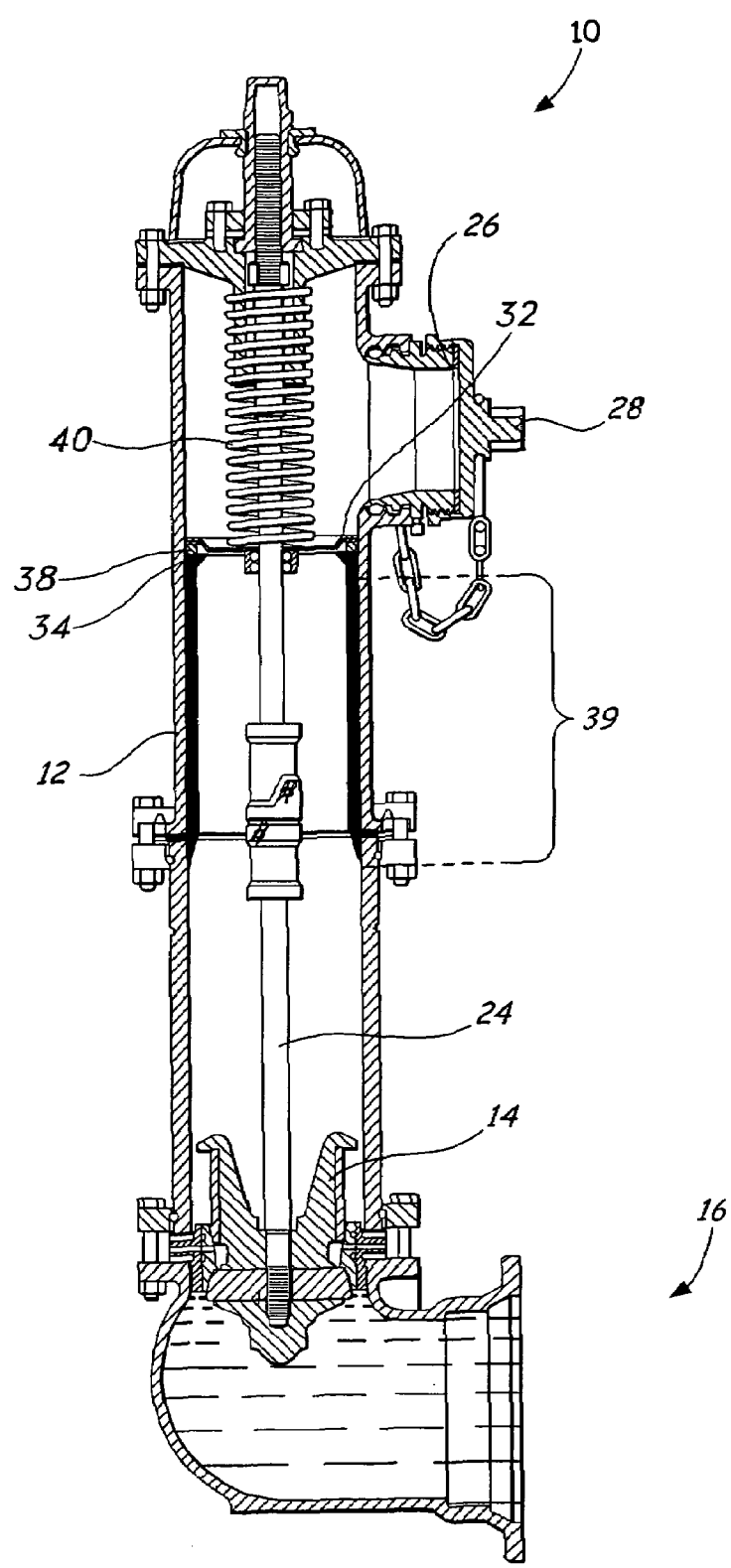
FIG. 6 shows the hydrant of FIG. 1, which can be any conventional hydrant, which includes one embodiment of a secondary valve, seat and elongated member according to a preferred embodiment of the present invention.

According to a first embodiment shown in FIG. 6, a secondary valve 32 according to the present invention could be considered, according to one view, to operate in logical fashion as an and gate, the logical operands being at least partial openness of both the nozzle 26 and the hydrant valve 14 (or otherwise when water pressure is applied through the barrel 12 to nozzle 26) thus prohibiting miscreants or others the opportunity to introduce toxins into the hydrant 10.

In the embodiment shown in FIG. 6, secondary valve 32 includes a seat 34, which is mounted to barrel 12 in a manner that allows valve 32 to be retrofitted to the hydrant 10. The seat 34 may be supported by an elongated member 39. As explained in more detail below, in one embodiment, an elongated member 39 assists in retrofitting a hydrant with a secondary valve 32. A valve 32 cooperates with seat 34 to obstruct the flow of water and other liquids in the barrel 12 upon certain conditions being met. Valve 32 may preferably be disc shaped to correspond generally to the inside surfaces of the barrel 12. In other embodiments, the valve 32 may be rectangle, square, or any size and shape in order to cooperate with the seat 34 to obstruct the flow of water. In addition, the seat 34 and valve 32 may close off portions of the barrel 12 to preclude or render more difficult introduction of toxins into the closed-off portions of the barrel 12. In the embodiment shown in FIG. 6, the seat 34 also includes an "O" ring or quad ring 38 that helps form a seal between seat 34 and barrel 12, on the one hand, and seat 34 and valve 32 on the other hand.

The seat 34 may preferably be made from brass or alternatively made from any metal, plastic, or rubber that is able to cooperate with the valve 32 to obstruct the flow of water and be resistant to corrosion due to intermittent or long-term exposure to water. The barrel 12 may preferably be made from cast iron or alternatively made from any metal or rigid material that provides the necessary strength to withstand the relatively high internal water pressure when necessary and to withstand varying external climate changes for a long period of time. The "O" ring or quad ring 38 may preferably be made from rubber or alternatively from any material that will provide a seal between the seat 34, barrel 12 and valve 32.

A biasing structure 40 can be disposed to bias the valve 32 against "O-ring" or quad ring 38 and/or valve seat 34. Biasing structure 40 may include any of the following, among others: any resilient member such as, for instance, including but not limited to a spring, any form of resilient material shaped or formed as desired, and/or a weight applied to valve 32 for biasing via gravity. As discussed below, biasing structure 40 may also include the actuator rod 24 if the valve 32 is coupled to the actuator rod 24 to travel in a manner corresponding to travel of rod 24 such as being mounted to rod 24.

When nozzle cap 28 is removed and nozzle 26 is open, the valve 32 prevents or substantially prevents toxins or other liquid, solids or materials from being poured into the barrel 12 below the nozzle 26. A reprobate, miscreant, villain or other unworthy type with ill or misguided will or intent cannot push down on or puncture valve 32 to open up the barrel 12 according to valve 32 formed according to preferred embodiments of the invention which provide suitable resistance to deformation or destruction such as by screwdrivers, crow bars, or other implements employed on occasion by those with ill design or for other purposes. Such malefactory activity is prevented because secondary valve 32 closes off barrel 12 in all cases except where water is flowing outwardly from water supply 16 through nozzle 26.

According to another embodiment, valve 32 is mounted to rod 24 in order to move with rod 24. In this embodiment, the valve 32 seats against bottom portions of valve seat 34 or an O-ring or quad ring 38 interposed below valve seat 34 so that secondary valve 32 opens when and only when rod 24 moves down, which also means that hydrant valve 14 is opening. In this embodiment, the secondary valve 32 could, unlike the valve of embodiment one, at least theoretically open to some extent when hydrant valve 14 is open but nozzle 26 is closed. As a practical matter, that makes no difference since cap 28 is on the nozzle 26 preventing introduction of undesired materials into hydrant 10.

Figure 7:
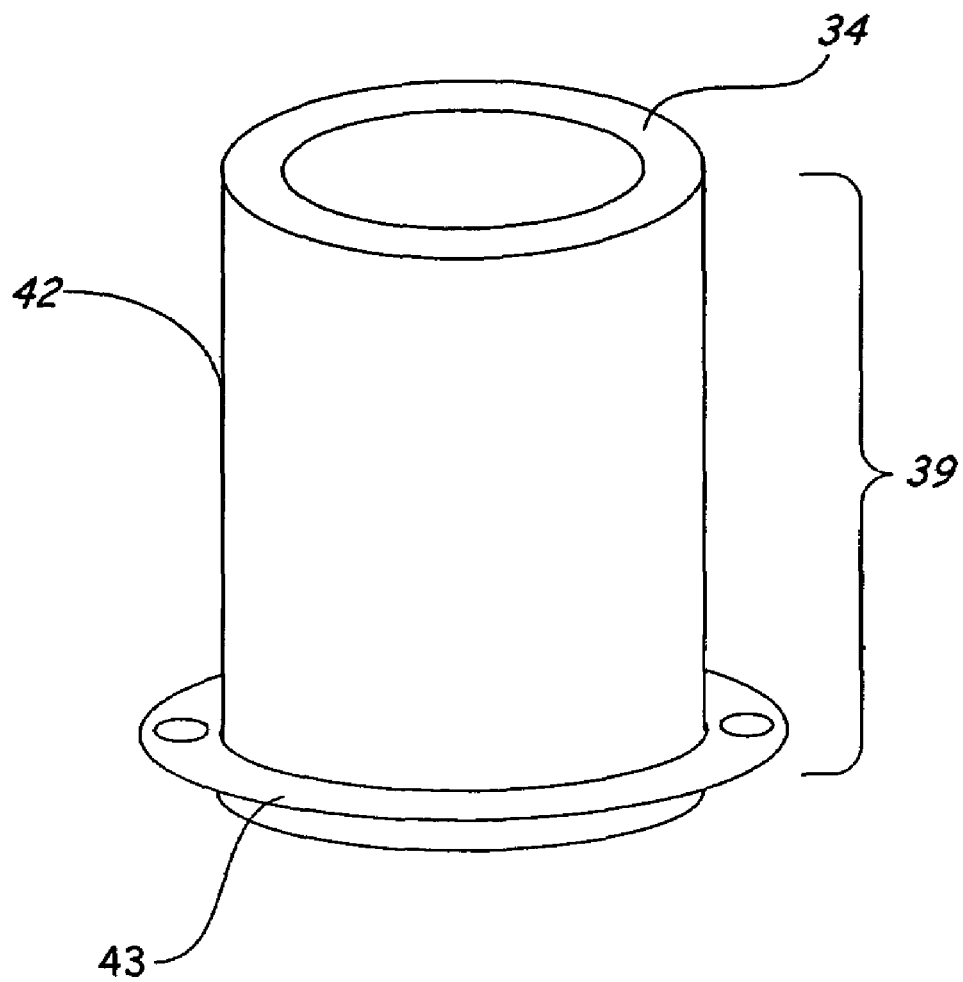
FIG. 7 shows the seat and elongated member of FIG. 6 according to one embodiment of the present invention.

Referring to FIG. 7, an embodiment of the seat 34 and elongated member 39 is shown. In one embodiment, the seat 34 may be a ledge around an opening to allow water or liquids to flow when the valve 14 and secondary valve 32 are opened. The seat is preferably connected to an elongated member 39 that extends in one direction from the seat 34. The elongated member 39 preferably includes a cylindrical portion 42 and a flange portion 43 extending outwardly with respect to the cylindrical portion 44. In one embodiment, the cylindrical portion 42 corresponds generally to the interior cavity of the hydrant body 12 and is essentially hollow to allow water to flow in certain conditions. The elongated member 39 may alternatively include any number of openings along the length of the elongated member 39 and include any number of elongated portions that assist in the installation of the seat 34. The elongated member 39 and flange portion 43 may preferably be made from brass or alternatively from any rigid material that will provide the necessary assistance to the installation of the seat 34 and keep the seat 34 in place by communicating with the barrel 12.

Figure 8:
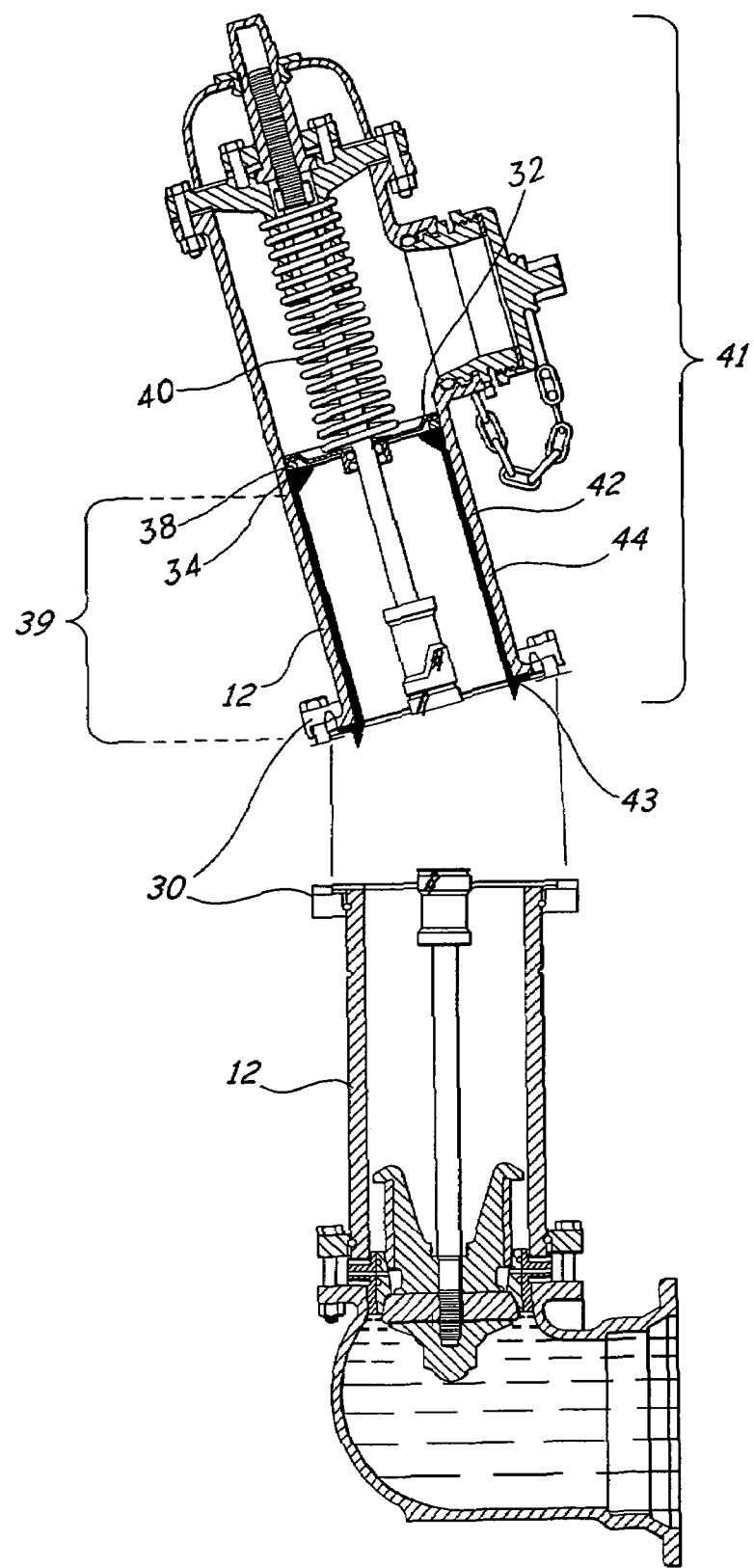
FIG. 8 shows another embodiment of retrofitting a hydrant with a secondary valve according to one embodiment of the present invention.

A retrofitting process according to one embodiment of the present invention is shown in FIG. 8. An upper portion 41 of the hydrant body 12 above the breakaway structure or traffic feature 30 is removed. In one embodiment of the present invention, the valve 32 is installed in the interior cavity of the hydrant body 12. In another embodiment of the present invention, the valve 32, biasing structure 40, and/or "O-ring" 38 is installed in the interior cavity of the hydrant body 12. A seat 34 and an elongated member 39 are then installed inside the upper portion 41 of hydrant body 12. The seat 34 is installed at a location to cooperate with valve 32 to obstruct the flow of water in the barrel 12 upon certain conditions being met. The cylindrical portion 42 of the elongated member 39 is installed adjacent to the interior cavity 44 of hydrant body upper portion 41 and extends to the breakaway structure or traffic feature 30. The flange portion 43 is adapted to be installed between the barrel 12 of the hydrant body upper portion 41 and the breakaway structure or traffic feature 30. The hydrant body upper portion 41 is then reattached at the breakaway structure or traffic feature 30.

Figure 9:
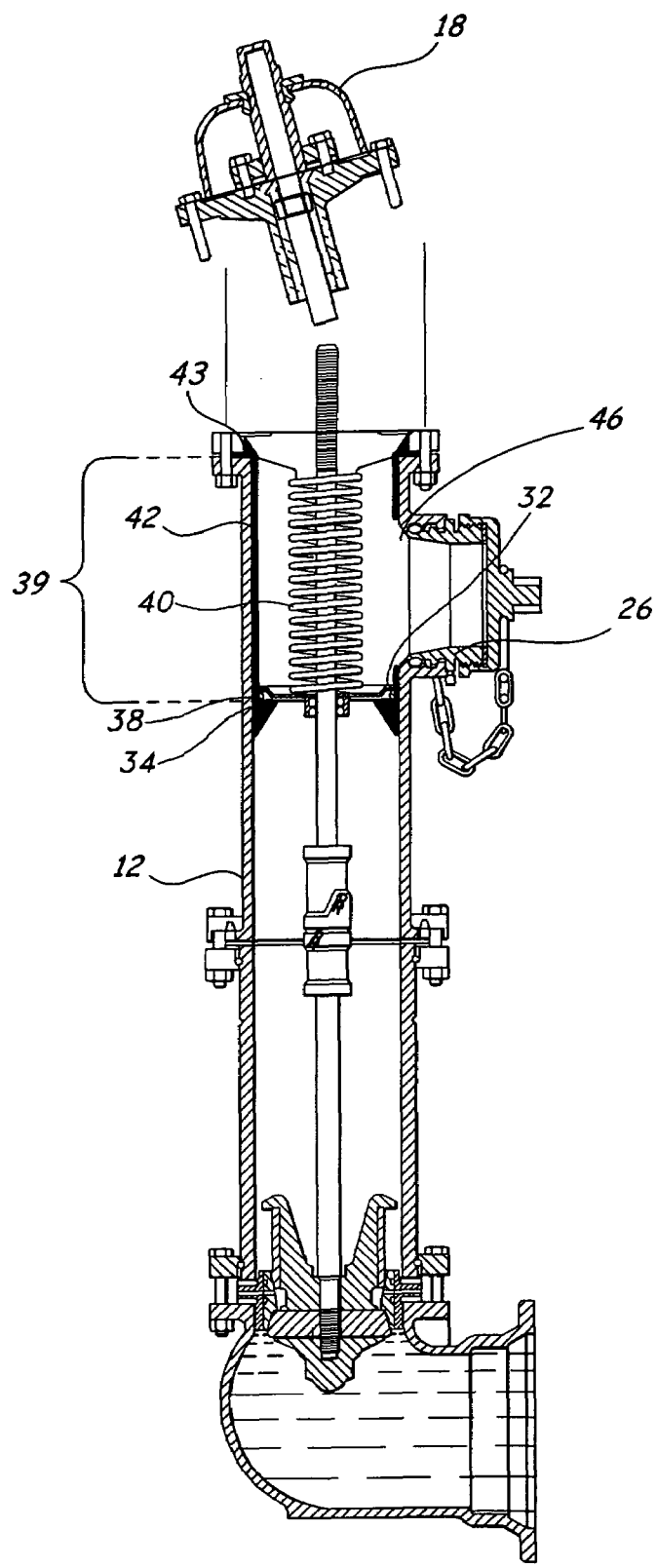
FIG. 9 shows an alternative embodiment of retrofitting a hydrant with a secondary valve according to one embodiment of the present invention.

A retrofitting process according to another embodiment of the present invention is shown in FIG. 9. The installer removes cap structure 18 in order to install the secondary valve 32. The seat 34 and elongated member 39 are installed with the seat 34 being placed at an appropriate location in order to cooperate with valve 32 to obstruct the flow of water in the barrel 12 upon certain conditions being met. The elongated member 39 extends in the direction of the cap structure 18 and comprises a cylindrical portion 42 and flange portion 43. The cylindrical portion 42 has an opening 46 to allow water to flow to the nozzle 26. The flange portion 43 is positioned so as to be held in place when the cap structure 18 is reattached. The secondary valve 32 is then installed and cap structure 18 reattached.

Any desired physical structure may be employed in order to produce or preclude introduction of undesired materials into fire hydrants. Components of embodiments according to the present invention are preferably durable materials but may be of any desired material. It is conventional for many components of fire hydrants to be bronze, and at least some or all of metallic components of structures according to various embodiments of the present invention may be formed of bronze or other conventional or even unconventional materials. For example, in some embodiments, at least some of the components, such as the valve and/or the seat and elongated member, may be formed from iron and dipped in or coated with a liquid material, such as rubber or plastic. Alternatively, in some embodiments, iron components may be encapsulated in SBR rubber or powder coated. Such processes may protect the iron components from corrosion or other types of decay. Such processes may also facilitate the seal between the valve and the seat, potentially obviating the need for a separate gasket.

O-rings or quad rings may be formed of conventional materials used in fire hydrants, or unconventional materials. Suitable resilient structures such as springs which may form biasing structures 40 may be formed of any desired material having requisite modulus of elasticity, durability, costs, and other properties.

Modifications, adaptations, changes, deletions, and additions may be made to various embodiments of the present invention as disclosed in this document without departing from the scope or spirit of the invention.

What is claimed:

1. A method for retrofitting a fire hydrant with a secondary valve comprising:
   (a) selecting a hydrant, which has been installed in a water supply system and is in service in the system, the hydrant comprising an outlet, an interior cavity and a primary valve;
   (b) temporarily removing a portion of the hydrant to allow access to the interior cavity for conducting the retrofitting;
   (c) installing a secondary valve in the interior cavity of the hydrant between the primary valve and the outlet, the secondary valve adapted to cooperate with an insert to form a secondary valve, the secondary valve adapted to prevent fluid flowing toward the primary valve;
   (d) installing an insert in the interior cavity of the hydrant between the primary valve and the outlet, the insert comprising a seat adapted to fit with the secondary valve in a substantially fluid tight relationship, and an elongated portion for positioning the seat at a desired position in the interior cavity of the hydrant; and
   (e) reconnecting the portion of the hydrant that was temporarily removed, or connecting corresponding structure, to restore the hydrant to service.

2. The method of claim 1 further comprising installing an insert in the interior cavity of the hydrant, wherein the elongated member comprises a cylindrical portion and a flange portion extending outwardly with respect to the cylindrical portion.

3. The method of claim 2 further comprising installing the insert in the interior cavity of the hydrant, wherein the flange portion is adapted to keep the insert in one position after installation.

4. The method of claim 2 further comprising installing the insert in the interior cavity of the hydrant, wherein the cylindrical portion is configured to allow the flow of liquids.

5. The method of claim 2 further comprising installing the insert in the interior cavity of the hydrant, wherein the seat is adapted to cooperate with the secondary valve to obstruct the flow of liquids in the fire hydrant barrel.

6. The method of claim 1 further comprising installing the insert in the interior cavity of the hydrant, wherein the seat is a ledge with an opening to allow liquids to flow when the secondary valve is opened.

7. The method according to claim 1 further comprising removing the upper portion of the hydrant.

8. The method according to claim 1 further comprising reattaching the upper portion of the hydrant.

9. The method according to claim 1 further comprising retrofitting a fire hydrant with the secondary valve, wherein the secondary valve is adapted to be open when the primary valve is open and adapted to be closed when the primary valve is closed.

10. A fire hydrant that has been retrofitted with a secondary valve, the fire hydrant comprising:
   a barrel with an interior cavity;
   a primary valve for controllably allowing liquid to flow from a conduit;
   a secondary valve for controllably allowing liquid to flow through the barrel; and
   an insert for positioning a secondary valve in a fire hydrant, the insert comprising
      a seat for sealing the interior cavity of the fire hydrant at the secondary valve when the secondary valve is in a closed position;
      an elongated member extending from the seat for positioning the seat between the primary valve and the outlet, wherein the elongated portion is substantially hollow to allow the flow of liquids; and
      a flange portion extending from the elongated member for keeping the seat in place by cooperating with a barrel of the hydrant.

11. The fire hydrant in claim 10, wherein the elongated member comprises a cylindrical portion and a flange portion extending outwardly with respect to the cylindrical portion.

12. The fire hydrant in claim 10, wherein the flange portion is adapted to keep the insert in one position after installation.

13. The fire hydrant in claim 10, wherein the elongated member has an opening in the side of the elongated member to be essentially aligned with a fire hydrant nozzle and adapted to allow the flow of liquids.

14. The fire hydrant in claim 10, wherein the seat is a ledge with an opening to allow liquids to flow when the secondary valve is opened.

15. The fire hydrant in claim 10, wherein the secondary valve is adapted to open when the primary valve is open and close when the primary valve is closed.

16. The fire hydrant in claim 10, wherein the secondary valve is adapted to close when the primary valve is closed, but not necessarily open when the primary valve is opened.

17. A fire hydrant that has been retrofitted with a secondary valve, the fire hydrant comprising:
   a barrel with an interior cavity;
   a primary valve for controllably allowing liquid to flow from a conduit;
   a secondary valve for controllably allowing liquid to flow through the barrel;
   an insert for positioning a secondary valve in a fire hydrant, the insert comprising
      a seat for sealing the interior cavity of the fire hydrant at the secondary valve when the secondary valve is in a closed position;
      an elongated member extending from the seat for positioning the seat between the primary valve and the outlet, wherein the elongated portion is substantially hollow to allow the flow of liquids; and
      a flange portion extending from the elongated member for keeping the seat in place by cooperating with a barrel of the hydrant; and
   wherein the secondary valve is open when the primary valve is open and closed when the primary valve is closed.

18. The fire hydrant in claim 17, further comprising an elongated member with an opening in the side of the elongated member to be essentially aligned with a fire hydrant nozzle and adapted to allow the flow of liquids.

19. The fire hydrant in claim 17, wherein the flange portion is adapted to keep the insert in one position after installation.

20. The fire hydrant in claim 17, wherein the seat is a ledge with an opening to allow liquids to flow when the secondary valve is opened.

21. The fire hydrant in claim 17, wherein the secondary valve is adapted to close when the primary valve is closed, but not necessarily open when the primary valve is opened.

* * * * *